Patented Apr. 26, 1927.

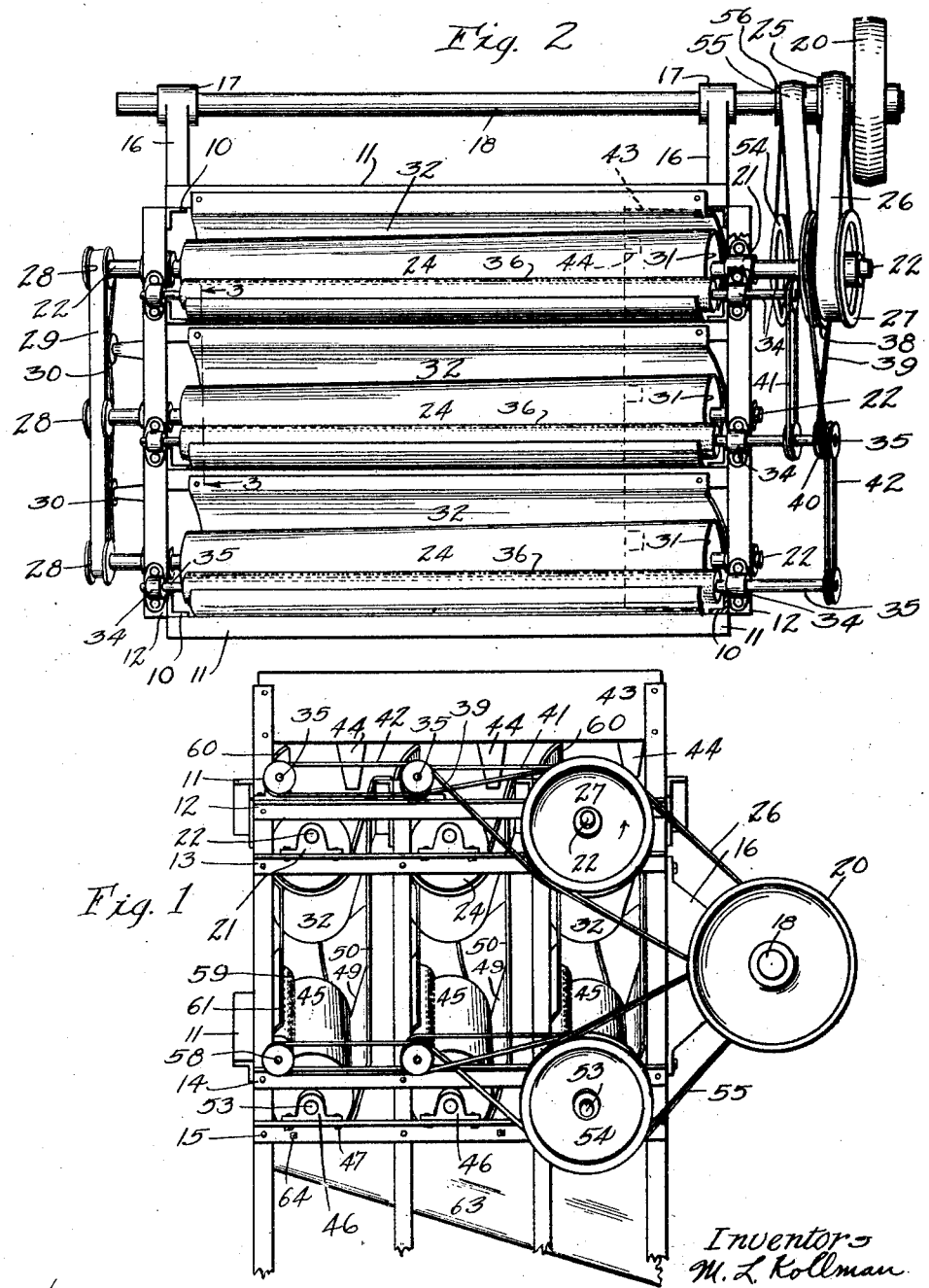

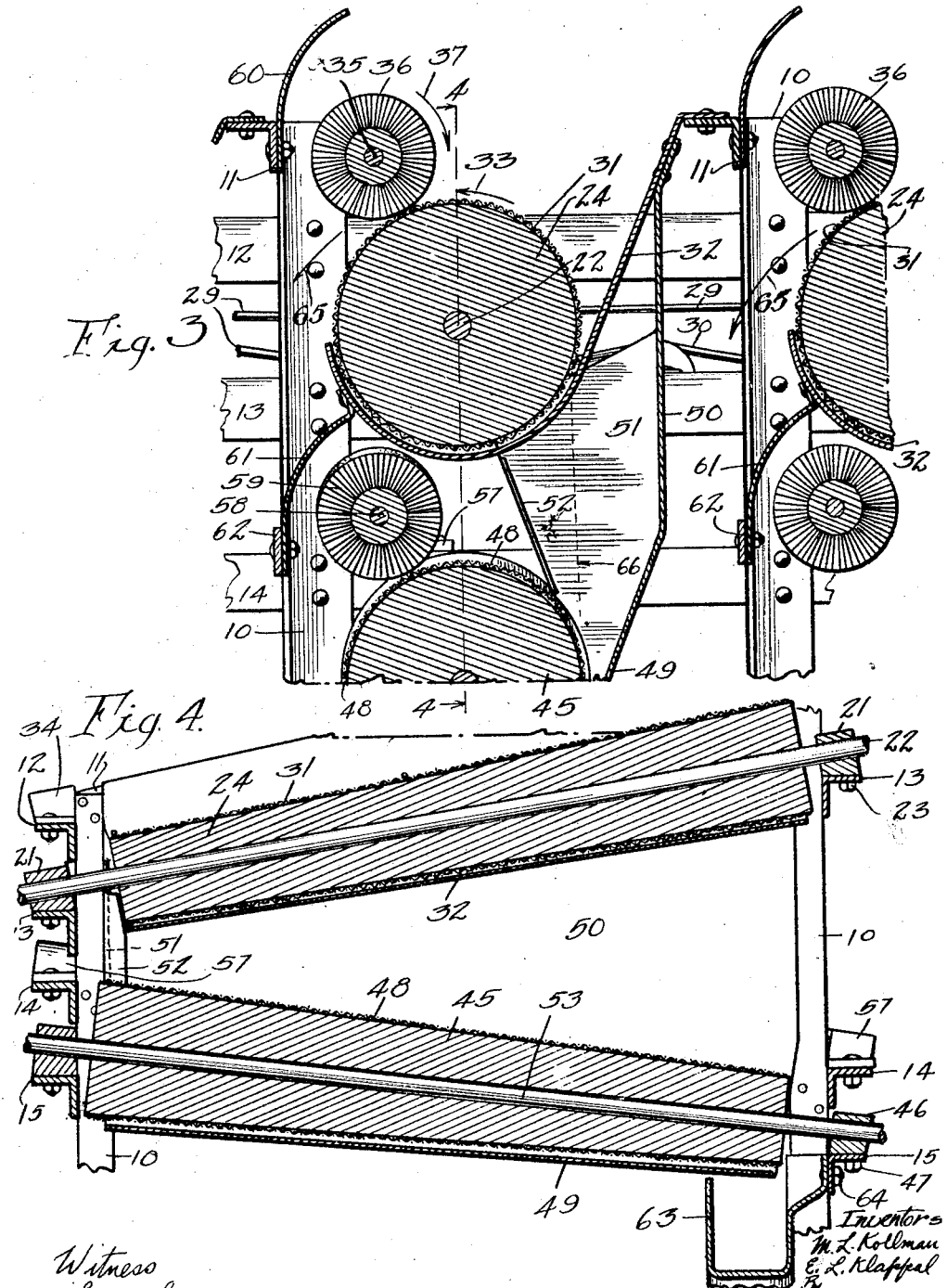

1,625,858

UNITED STATES PATENT OFFICE.

MELVIN L. KOLLMAN, OF SIOUX CITY, IOWA, AND EMIEL L. KLAPPAL, OF WITTON, SOUTH DAKOTA.

SEED-CLEANING MACHINE.

Application filed July 18, 1924. Serial No. 726,740.

The object of our invention is to provide a seed separating machine especially adapted for separating fox-tail and pigeon grass seed from the ordinary alfalfa clover, and other seed of substantially the same size, the machine being comparatively simple, easy to operate and one which can be manufactured and marketed at a comparatively low cost.

In this connection, it may be mentioned that in certain portions of the country where alfalfa and clover are grown, certain wild grass known as fox-tail and pigeon grass, grow with the alfalfa, clover and the like, and when the seed is taken from the clover and alfalfa, the wild fox-tail and pigeon seed is mixed with the good seed, such as the alfalfa and clover seed.

The fox-tail and pigeon grass seed is the same size and weight as the clover and alfalfa seed, and for that reason, it is impossible to use any blowing element to separate one kind of seed from the other.

The fox-tail and pigeon grass seed, however, has a peculiar characteristic in that it is comparatively rough while the seed of clover and alfalfa is smooth and, in order to separate the undesirable seed, it is necessary to employ a means for engaging and separating the undesired seed from the good, clean seed and it is our object to provide a machine wherein the fox-tail and pigeon grass seed can be quickly and completely separated from alfalfa and clover seed after the same has come through a cleaning mill of the ordinary kind.

Another object is to provide a seed separating machine in which the rollers are tapered so as to be smaller at their discharge ends than at the receiving ends.

Still a further object is to provide a cloth covered roller, which will pass through the seed and pick up the fox-tail and pigeon grass due to its rough surface, and carry the same to a place where a brush will operate for separating the undesired seed from the cloth covered roller. The good seed being smooth, will not stick to the roller, and will pass out of the machine separated from the pigeon grass and fox-tail seed.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1 is an end view of our seed separating machine, showing the drive belts for operating the various rollers and brushes.

Figure 2 is a top, plan view of the machine, the seed hopper being shown in dotted lines thereon.

Figure 3 is a detail, sectional view taken on line 3—3 of Figure 2.

Figure 4 is a vertical, sectional view taken on line 4—4 of Figure 3, showing the cloth covered rollers.

In the accompanying drawings, we have used the reference numeral 10 to indicate generally vertical posts in the form of angle irons, which are connected together on their sides by cross pieces 11 and on their ends by cross pieces 12, 13, 14 and 15. The parts just described form the rigid frame of our machine.

Mounted on one side of the machine and fixed to two of the uprights are the brackets 16, which form bearings 17 for the drive shaft 18.

The drive shaft 18 has fixed to it an enlarged pulley 20, which may be connected to a line shaft for driving the shaft 18, which in turn drives the mechanism, which we shall hereinafter describe.

The machine which we have shown is built up of three units, each unit operating exactly alike.

Mounted upon the cross pieces 13 are the bearing members 21 which have journalled therein the shafts 22.

The bearing members 21 are secured to the cross pieces 13 by means of the bolts 23.

The shafts 22 extend from one end of the machine to the other end of the machine and are inclined relative to horizontal, as clearly shown in Figure 4 of the drawings.

Mounted upon each of the shafts 22 is a roller 24 which is of greater diameter at its upper end than at its lower end so that the entire roller is tapered from its top to its bottom end.

We find that the tapered roller is effective to assist the progress of seeds flowing through the machine by increasing the speed of the flow of such seeds. I attribute this quality of the tapered roller to an action similar to that of an auger.

There are three sets of upper rollers 24, as clearly shown in Figure 2 of the drawings, and in order to operate the shafts 22 for rotating the rollers 24, we mount a pulley wheel 25 upon the drive shaft 18, which is operatively connected to one of the shafts 22 by means of a belt 26 extending around the pulley wheel 27.

The pulley wheel 27 is connected to one of the shafts 22, as clearly shown in Figure 2 of the drawings.

The shaft 22 extends beyond the bearing 21 in which it is mounted, for permitting the pulley wheel 27 to be secured thereto.

On the opposite end of the machine, each of the shafts 22 are projected beyond the bearing members 21 and have mounted thereon pulley wheels 28. The pulley wheels 28 are in line with each other and belts 29 extend therearound for operating the other two sets of rollers.

Belt tighteners 30 are positioned between the pulley wheels 28 and rest against the belt 29 for tightening the same so as to insure proper driving of the various rollers 24.

From the construction of the parts just described, it will be seen that one of the shafts 22 is operated from the drive shaft 18, and the remainder of the shafts 22 are operated from the shaft 22, which is connected to the shaft 18 by means of the belt 26.

Each of the rollers 24 are covered with the cloth sheet 31, the purpose of which will be hereinafter more fully set forth.

The upper cross pieces 11 are inclined from one end of the machine to the other, substantially like the rollers 24.

Secured to the upper cross pieces 11 are the troughs 32, which receive the rollers 24 therein, one of the troughs 32 and one of the rollers 24 being clearly shown in Figure 3 of the drawings.

The roller 24 travels in the direction indicated by the arrows 33.

Mounted in bearing members 34 placed upon the cross pieces 12 on each of the ends of the machine, are the shafts 35.

Mounted upon each of the shafts 35 and engaging the cloth covered rollers 34 are the roller brushes 36. The roller brushes 36 are rotated in the direction indicated by the arrow 37.

In order to drive the shafts 35 for retaining the roller brushes 36, we mount a pulley wheel 38 on the shaft 22, which has the pulley wheel 27 thereon.

The middle shaft 35 of the three is connected to the pulley 38 by means of a belt 39, which is crossed so as to rotate the middle shaft 35 in the proper direction.

The belt 39 passes around the pulley 40 on the middle shaft 35. The other two shafts 35 are then connected to the middle shaft 35 by means of the belts 41 and 42, which pass over pulleys mounted on the shafts 35.

From the construction of the parts just described, it will be seen that the middle shaft 35 will be rotated from one of the shafts 22, and it in turn, due to the belts 41 and 42, will rotate the other two shafts 35.

Two of the uprights or posts 10 project above the remainder of the machine so as to form a support for the said hopper 43.

The said hopper 43 has three discharge spouts 44, each of which discharge into the troughs 32.

One cloth covered roller and one of the roller brushes 36, together with one of the troughs 32 form one unit of the machine.

Spaced directly below each of the rollers 24 are the rollers 45, which are journalled in bearings 46 mounted on the cross pieces 15 and secured thereto by means of the bolts 47.

The rollers 45 are inclined from one end of the machine to the other in a direction opposite from the inclination of the rollers 24.

The rollers 45 are tapered so that the upper ends are of greater diameter than their lower ends. The large ends of the rollers 45 are spaced near the small end of the rollers 24.

The rollers 45 are covered with a sheet of cloth 48, which is similar to the cloth sheet 31 on the rollers 24 but of finer texture.

A trough 49 is provided for each of the rollers 45, which troughs are secured to the upper troughs 32 by means of an extension or wall 50, as clearly shown in Figure 3 of the drawings.

The upper end of the wall 50 is riveted to the side of the upper trough 32.

The wall 50 of the trough 49 is provided with a wall 51 formed at right angles to the wall 50, and which is parallel with the ends of the machine.

The wall 51 has a short inturned flange 52 positioned between the upper trough 32 and the lower cloth covered rollers 45. The lower rollers 45 are mounted on shafts 53, which are journalled in the bearings 46.

One of the shafts 53 has mounted on it a pulley wheel 54, which has a belt 55 thereover which in turn extends over a pulley 56 on the drive shaft 18.

The remaining shafts 53 are connected together on the opposite side of the machine and driven in the identical manner as shown for driving the upper roller shafts 22.

Mounted upon the cross braces 14 are bearings 57 which are journalled to shafts 58.

The shafts 58 have mounted thereon roller brushes 59.

The shafts 58 are driven in exactly the same manner as the roller shafts 35 are driven, and we have used the same reference numerals to indicate the drive belts and pulleys.

From the construction of the parts heretofore described, it will be seen that the upper rollers as well as the lower rollers, together with the brushes for each of the rollers, are all operated from the common drive shaft 18.

The upper roller brushes 36 have guards 60 secured to the upper cross pieces 11. Guards 61 for the lower roller brushes 59 are secured to the troughs 32 near one of their edges, and also to cross bars 62 extended from one end of the machine to the other and secured to the uprights 10.

Below the lower ends of the lower rollers 45, we mount a receiving trough 63, into which the clean seed passes into after leaving the machine. The receiving trough is fixed to the lower cross piece 15 by means of the bolts 64.

*Practical operation.*

We shall now describe in detail the operation of our machine.

The seed, as it comes in from the mills, is mixed with pigeon grass and fox-tail seed, and it is desirable to remove the same from either the alfalfa or clover seed, as the case may be, and when the seed comes from the mill it is passed into the hopper 43.

The seed passes through the spouts 44 and drops on to the troughs 32. The upper rollers 24 travel at about 30 revolutions per minute, and there is just enough clearance between the lower brush of the rollers 24 and the troughs 32 to permit the seed to pass therebetween.

The troughs, being inclined from one end of the machine to the other end, will permit the seed to slide down to the lower end of the trough. In the meantime, the cloth sheet 31 on the roller 24, will engage any of the undesired seed, which is usually fox-tail and pigeon grass seed, due to their rough, outer surfaces, will be carried upon the cloth sheet in the direction indicated by the arrow 33.

The roller brush 36 is operated at a considerably faster speed than the roller 24, which will brush the seed sticking to the cloth sheet 31 therefrom so that it will fall clear of the machine in the direction indicated by the arrow 65.

The clover seed or alfalfa seed, being smooth, will work its way down to the lower end of the upper trough 32 and will then drop therefrom on to the roller 45 and lower trough 49.

The fact that the upper roller is rotated in the direction indicated by the arrows 33 will cause the good seed to drop therefrom and fall substantially in a line indicated by the reference numeral 66. Any of the undesired seed, which has worked its way by the upper roller 24 and the trough 32, will then be picked up by the cloth sheet 48 on the lower roller 45. Any undesired seed which sticks to the cloth sheet 48, will be pushed therefrom by means of the roller brush 59.

The guard 61 will cause the undesired seed to fall in the proper direction without any danger of it becoming mixed with the other seed.

The lower rollers 45 travel at a rate of about 20 revolutions per minute and the lower roller brushes 59 travel at a much greater speed. The lower roller 45 and roller brush 59 operate in the same direction as do the upper roller 24 and roller brush 26. After the seed has worked its way down to the lower end of the trough 49, it drops into the discharge trough 63 where it may be carried to suitable containers.

It will be seen that we have provided a machine wherein a cloth covered roller, in passing through the mixed seed, will separate the undesired seed and carry it away so that the remaining seed will be pure.

Some changes may be made in the construction and arrangement of the various parts of our invention, without departing from the real spirit and purpose of our invention and it is our intention to cover by our claims, any modified forms of structure or use of mechanical equivalents, which may be reasonably included within their scope.

We claim as our invention:

1. A seed separating machine comprising a frame, an inclined trough mounted thereon, a cloth covered roller journalled on said frame and arranged in said trough said roller being tapered so as to be smaller at its discharge end than at its receiving end and a roller brush in contact with said cloth covered roller so that seed carried upon said cloth covered roller may be brushed therefrom by said roller brush.

2. A seed separating machine comprising a frame, an inclined trough mounted thereon, a roller journalled on said frame and partially extended into said trough, said roller being tapered so as to be smaller at its discharge end than at its receiving end, a hopper for delivering mixed seed into said trough, said roller having a sheet of filament like members for engaging and carrying away the seed thereon that have roughened surfaces for separating them from the smooth seed, and means for removing the rough surfaced seeds from said sheet.

3. In a seed cleaning machine, a frame, an upper and lower cloth covered roller, troughs enclosing the lower portions of the rollers, the upper roller being arranged with its discharge end below its receiving end, and spaced near the receiving end of the lower roller, the lower roller being inclined downwardly toward its discharge end, the rollers being tapered so as to be smaller at their discharge ends than at their receiving ends, the lower roller being of larger mean diameter than the upper roller, and means for rotating the lower roller more slowly than the upper roller, the upper roller being adapted to discharge seed to the lower roller.

Des Moines, Iowa, June 24, 1924.

EMIEL L. KLAPPAL.
MELVIN L. KOLLMAN.